United States Patent
Langhammer et al.

(10) Patent No.: US 7,822,799 B1
(45) Date of Patent: Oct. 26, 2010

(54) ADDER-ROUNDER CIRCUITRY FOR SPECIALIZED PROCESSING BLOCK IN PROGRAMMABLE LOGIC DEVICE

(75) Inventors: Martin Langhammer, Alderbury (GB); Triet M. Nguyen, San Jose, CA (US); Yi-Wen Lin, Pasadena, CA (US)

(73) Assignee: Altera Corporation, San Jose, CA (US)

( * ) Notice: Subject to any disclaimer, the term of this patent is extended or adjusted under 35 U.S.C. 154(b) by 1157 days.

(21) Appl. No.: 11/426,403

(22) Filed: Jun. 26, 2006

(51) Int. Cl.
*G06F 7/38* (2006.01)
(52) U.S. Cl. ....................... 708/551; 708/709
(58) Field of Classification Search ......... 708/700–714, 708/550–553
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,597,053 A | 6/1986 | Chamberlin |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,791,590 A | 12/1988 | Ku et al. |
| 4,799,004 A | 1/1989 | Mori |
| 4,823,295 A | 4/1989 | Mader |

(Continued)

FOREIGN PATENT DOCUMENTS

EP          0 158 430          10/1985

(Continued)

OTHER PUBLICATIONS

Altera Corporation, "Digital Signal Processing (DSP)," *Stratix Device Handbook*, vol. 2, Chapter 6 and Chapter 7, v1.1 (Sep. 2004).

(Continued)

*Primary Examiner*—Tan V Mai
(74) *Attorney, Agent, or Firm*—Ropes & Gray LLP; Jeffrey H. Ingerman

(57) ABSTRACT

Adder/rounder circuitry for use in a programmable logic device computes a rounded sum quickly, and ideally within one clock cycle. The rounding position is selectable within a range of bit positions. In an input stage, for each bit position in that range, bits from both addends and a rounding bit are processed, while for each bit position outside that range only bits from both addends are processed. The input stage processing aligns its output in a common format for bits within and outside the range. The input processing may include 3:2 compression for bit positions within the range and 2:2 compression for bit positions outside the range, so that further processing is performed for all bit positions on a sum vector and a carry vector. Computation of the sum proceeds substantially simultaneously with and without the rounding input, and rounding logic makes a selection later in the computation.

29 Claims, 10 Drawing Sheets

U.S. PATENT DOCUMENTS

| | | |
|---|---|---|
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A * | 3/1996 | Saishi et al. ................ 708/551 |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,340 A | 3/2000 | Mintzer |
| 6,052,327 A | 4/2000 | Reddy et al. |
| 6,052,755 A | 4/2000 | Terrill et al. |
| 6,055,555 A * | 4/2000 | Boswell et al. ............. 708/551 |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |

| | | | | | | |
|---|---|---|---|---|---|---|
| 6,091,765 | A | 7/2000 | Pietzold, III et al. | 6,781,410 B2 | 8/2004 | Pani et al. |
| 6,094,726 | A | 7/2000 | Gonion et al. | 6,788,104 B2 | 9/2004 | Singh et al. |
| 6,097,988 | A | 8/2000 | Tobias | 6,801,924 B1 | 10/2004 | Green et al. |
| 6,098,163 | A | 8/2000 | Guttag et al. | 6,836,839 B2 | 12/2004 | Master et al. |
| 6,107,820 | A | 8/2000 | Jefferson et al. | 6,874,079 B2 | 3/2005 | Hogenauer |
| 6,107,821 | A | 8/2000 | Kelem et al. | 6,904,471 B2 | 6/2005 | Boggs et al. |
| 6,107,824 | A | 8/2000 | Reddy et al. | 6,924,663 B2 | 8/2005 | Masui et al. |
| 6,130,554 | A | 10/2000 | Kolze et al. | 6,963,890 B2 | 11/2005 | Dutta et al. |
| 6,140,839 | A | 10/2000 | Kaviani et al. | 6,971,083 B1 | 11/2005 | Farrugia et al. |
| 6,154,049 | A | 11/2000 | New | 6,978,287 B1 | 12/2005 | Langhammer |
| 6,157,210 | A | 12/2000 | Zaveri et al. | 7,020,673 B2 | 3/2006 | Ozawa |
| 6,163,788 | A | 12/2000 | Chen et al. | 7,093,204 B2 | 8/2006 | Oktem et al. |
| 6,167,415 | A | 12/2000 | Fischer et al. | 7,107,305 B2 | 9/2006 | Deng et al. |
| 6,175,849 | B1 | 1/2001 | Smith | 7,113,969 B1 | 9/2006 | Green et al. |
| 6,215,326 | B1 | 4/2001 | Jefferson et al. | 7,181,484 B2 | 2/2007 | Stribaek et al. |
| 6,226,735 | B1 | 5/2001 | Mirsky | 7,313,585 B2 | 12/2007 | Winterrowd |
| 6,242,947 | B1 | 6/2001 | Trimberger | 7,395,298 B2 | 7/2008 | Debes et al. |
| 6,243,729 | B1 | 6/2001 | Staszewski | 7,409,417 B2 | 8/2008 | Lou |
| 6,246,258 | B1 | 6/2001 | Lesea | 7,415,542 B2 | 8/2008 | Hennedy et al. |
| 6,279,021 | B1 | 8/2001 | Takano et al. | 7,421,465 B1 | 9/2008 | Rarick et al. |
| 6,286,024 | B1 | 9/2001 | Yano et al. | 7,428,566 B2 | 9/2008 | Siu et al. |
| 6,314,442 | B1 | 11/2001 | Suzuki | 7,430,578 B2 | 9/2008 | Debes et al. |
| 6,314,551 | B1 | 11/2001 | Borland | 7,430,656 B2 | 9/2008 | Sperber et al. |
| 6,321,246 | B1 | 11/2001 | Page et al. | 7,472,155 B2 | 12/2008 | Simkins et al. |
| 6,323,680 | B1 | 11/2001 | Pedersen et al. | 7,590,676 B1 | 9/2009 | Langhammer |
| 6,327,605 | B2 | 12/2001 | Arakawa et al. | 7,646,430 B2 | 1/2010 | Brown Elliott et al. |
| 6,351,142 | B1 | 2/2002 | Abbott | 2001/0023425 A1 | 9/2001 | Oberman et al. |
| 6,353,843 | B1 | 3/2002 | Chehrazi et al. | 2001/0029515 A1 | 10/2001 | Mirsky |
| 6,359,468 | B1 | 3/2002 | Park et al. | 2002/0002573 A1 | 1/2002 | Landers et al. |
| 6,360,240 | B1 | 3/2002 | Takano et al. | 2002/0089348 A1 | 7/2002 | Langhammer |
| 6,362,650 | B1 | 3/2002 | New et al. | 2002/0116434 A1 | 8/2002 | Nancekievill |
| 6,366,944 | B1 | 4/2002 | Hossain et al. | 2003/0088757 A1 | 5/2003 | Lindner et al. |
| 6,367,003 | B1 | 4/2002 | Davis | 2004/0064770 A1 | 4/2004 | Xin |
| 6,369,610 | B1 | 4/2002 | Cheung et al. | 2004/0083412 A1 | 4/2004 | Corbin et al. |
| 6,377,970 | B1 | 4/2002 | Abdallah et al. | 2004/0103133 A1 | 5/2004 | Gurney |
| 6,407,576 | B1 | 6/2002 | Ngai et al. | 2004/0148321 A1 | 7/2004 | Guevorkian et al. |
| 6,407,694 | B1 | 6/2002 | Cox et al. | 2004/0178818 A1 | 9/2004 | Crotty et al. |
| 6,434,587 | B1 | 8/2002 | Liao et al. | 2004/0193981 A1 | 9/2004 | Clark et al. |
| 6,438,569 | B1 | 8/2002 | Abbott | 2004/0267863 A1 | 12/2004 | Bhushan et al. |
| 6,438,570 | B1 | 8/2002 | Miller | 2005/0038842 A1 | 2/2005 | Stoye |
| 6,446,107 | B1 * | 9/2002 | Knowles ............ 708/707 | 2005/0144212 A1 | 6/2005 | Simkins et al. |
| 6,453,382 | B1 | 9/2002 | Heile | 2005/0144215 A1 | 6/2005 | Simkins et al. |
| 6,467,017 | B1 | 10/2002 | Ngai et al. | 2005/0144216 A1 | 6/2005 | Simkins et al. |
| 6,480,980 | B2 | 11/2002 | Koe | 2005/0166038 A1 | 7/2005 | Wang et al. |
| 6,483,343 | B1 | 11/2002 | Faith et al. | 2005/0187999 A1 | 8/2005 | Zheng et al. |
| 6,487,575 | B1 | 11/2002 | Oberman | 2007/0185951 A1 | 8/2007 | Lee et al. |
| 6,523,055 | B1 | 2/2003 | Yu et al. | 2007/0185952 A1 | 8/2007 | Langhammer et al. |
| 6,531,888 | B2 | 3/2003 | Abbott | 2008/0133627 A1 | 6/2008 | Langhammer et al. |
| 6,538,470 | B1 | 3/2003 | Langhammer et al. | 2009/0187615 A1 | 7/2009 | Abe et al. |
| 6,542,000 | B1 | 4/2003 | Black et al. | | | |
| 6,556,044 | B2 | 4/2003 | Langhammer et al. | | FOREIGN PATENT DOCUMENTS | |
| 6,557,092 | B1 | 4/2003 | Callen | | | |
| 6,571,268 | B1 | 5/2003 | Giacalone et al. | EP | 0 380 456 | 8/1990 |
| 6,573,749 | B2 | 6/2003 | New et al. | EP | 0 411 491 | 2/1991 |
| 6,574,762 | B1 | 6/2003 | Karimi et al. | EP | 0 461 798 | 12/1991 |
| 6,591,283 | B1 | 7/2003 | Conway et al. | EP | 0 498 066 | 8/1992 |
| 6,591,357 | B2 | 7/2003 | Mirsky | EP | 0 555 092 | 8/1993 |
| 6,600,495 | B1 | 7/2003 | Boland et al. | EP | 0 606 653 | 7/1994 |
| 6,600,788 | B1 | 7/2003 | Dick et al. | EP | 0 657 803 | 6/1995 |
| 6,628,140 | B2 | 9/2003 | Langhammer et al. | EP | 0 660 227 | 6/1995 |
| 6,687,722 | B1 | 2/2004 | Larsson et al. | EP | 0 668 659 | 8/1995 |
| 6,692,534 | B1 | 2/2004 | Wang et al. | EP | 0 905 906 | 3/1999 |
| 6,700,581 | B2 | 3/2004 | Baldwin et al. | EP | 0 909 028 | 4/1999 |
| 6,725,441 | B1 | 4/2004 | Keller et al. | EP | 0 927 393 | 7/1999 |
| 6,728,901 | B1 | 4/2004 | Rajski et al. | EP | 0 992 885 | 4/2000 |
| 6,731,133 | B1 | 5/2004 | Feng et al. | EP | 1 031 934 | 8/2000 |
| 6,732,134 | B1 | 5/2004 | Rosenberg et al. | EP | 1 058 185 | 12/2000 |
| 6,744,278 | B1 | 6/2004 | Liu et al. | EP | 1 220 108 | 7/2002 |
| 6,745,254 | B2 | 6/2004 | Boggs et al. | GB | 2 283 602 | 5/1995 |
| 6,763,367 | B2 | 7/2004 | Kwon et al. | GB | 2 286 737 | 8/1995 |
| 6,771,094 | B1 | 8/2004 | Langhammer et al. | GB | 2 318 198 | 4/1998 |
| 6,774,669 | B1 | 8/2004 | Liu et al. | JP | 61-237133 | 10/1986 |
| 6,781,408 | B1 | 8/2004 | Langhammer | JP | 7-135447 | 5/1995 |

| | | |
|---|---|---|
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO-2005/101190 | 10/2005 |

OTHER PUBLICATIONS

Weisstein, E.W., "Karatsuba Multiplication," *MathWorld—A Wolfram Web Resource* (Dec. 9, 2007), accessed Dec. 11, 2007 at http://mathworld.wolfram.com/KaratsubaMultiplication.html.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffar, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)* Oct. 21-24, 1996, pp. 275-279.

Jones, G., "Field-programmable digital signal conditioning," *Electronic Product Design*, vol. 21, No. 6, Jun. 2000, pp. C36-38.

Kiefer, R., et al., "Performance comparison of software/FPGA hardware partitions for a DSP application," *14th Australian Microelectronics Conference Microelectronics: Technology Today for the Future. MICRO '97 Proceedings*, Sep. 28-Oct. 1, 1997, pp. 88-93.

Kramberger, I., "DSP acceleration using a reconfigurable FPGA" *ISIE '99 Proceedings of the IEEE International Symposium on Industrial Electronics* (Cat. No. 99TH8465) vol. 3, Jul. 12-16, 1999, pp. 1522-1525.

Langhammer, M., "How to implement DSP in programmable logic," *Elettronica Oggi*, No. 266, Dec. 1998, pp. 113-115.

Langhammer, M., "Implementing a DSP in Programmable Logic," *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L, et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

Altera Corporation, "DSP Blocks in Stratix II and Stratix II GX Devices," *Stratix II Device Handbook*, vol. 2, Chapter 6, v4.0 (Oct. 2005).

Underwood, K. "FPGAs vs. CPUs: Trends in Peak Floating-Point Performance," *Proceedings of the 2004 ACM/SIGDA 12th International Symposium on Field Programmable Gate Arrays*, pp. 171-180, Feb. 22-24, 2004.

Xilinx Inc., "XtremeDSP Design Considerations User Guide," v 1.2, Feb. 4, 2005.

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673) Lysaght, P., et al., eds., Aug. 30-Sep. 1, 1999, pp. 264-273.

Tralka, C., "Embedded digital signal processor (DSP) modules in programmable logic devices (PLDs)," *Elektronik*, vol. 49, No. 14, Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on, a FPGA Based Custom Computing Platform," Allison L. Walters, Thesis Submitted to the Faculty of Virginia Polytechnic Institute and State University, Jan. 30, 1998.

Wenzel, L., "Field programmable gate arrays (FPGAs) to replace digital signal processor integrated circuits," *Elektronik*, vol. 49, No. 5, Mar. 7, 2000, pp. 78-86.

\* cited by examiner

ADDER-ROUNDER CIRCUITRY FOR SPECIALIZED PROCESSING BLOCK IN PROGRAMMABLE LOGIC DEVICE

BACKGROUND OF THE INVENTION

This invention relates to programmable logic devices (PLDs), and, more particularly, to specialized processing blocks which may be included in such devices.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, a PLD sold by Altera Corporation, of San Jose, Calif., under the name STRATIX® II includes DSP blocks, each of which includes four 18-by-18 multipliers. Each of those DSP blocks also includes adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed. In order to support four 18-by-18 multiplication operations, the block has 4×(18+18)=144 inputs. Similarly, the output of an 18-by-18 multiplication is 36 bits wide, so to support the output of four such multiplication operations, the block also has 36×4=144 outputs.

The operations performed by such DSP blocks frequently require rounding. However, known DSP blocks, including that provided in the aforementioned STRATIX® II PLD, have limited rounding capabilities.

It would be desirable to be able to provide improved rounding capabilities of the DSP block of a PLD.

SUMMARY OF THE INVENTION

The present invention relates to improved rounding circuitry for specialized processing blocks for PLDs.

As one example only, one type of specialized processing block with which the invention may be used is described in copending, commonly-assigned U.S. patent application Ser. No. 11/447,329, filed Jun. 5, 2006, which is hereby incorporated by reference herein in its entirety. Such a specialized processing block preferably includes a plurality of fundamental processing units instead of discrete multipliers. Each fundamental processing unit preferably includes the equivalent of at least two multipliers and logic to sum the partial products of all of the at least two multipliers. As a result, the sums of the all of the multiplications are computed in a single step, rather than summing the partial products of each multiplier to form individual products and then summing those products. Such a fundamental processing unit can be constructed with an area smaller than that of the individual multipliers and adders. If a single multiplication is required to be performed, one of the multipliers in the fundamental processing unit is used, while the inputs to the other(s) are zeroed out. Nevertheless, because the provision of the fundamental processing unit reduces the area of the specialized processing block, efficiency is improved.

In a preferred embodiment, the fundamental processing unit includes the equivalent of two 18-by-18 multipliers and one adder so that it can output the sum of the two multiplication operations. While each of the 18-by-18 multipliers can be configured for a smaller multiplication operation (e.g., 9-by-9 or 12-by-12), the integrated nature of the fundamental processing unit means that the individual multiplier outputs are not accessible. Only the sum is available for use by the remainder of the specialized processing block. Therefore, to obtain the result of a single non-complex multiplication that is 18 bits-by-18 bits or smaller, an entire fundamental processing unit must be used. The second multiplier, which cannot be disengaged, simply has its inputs zeroed.

The specialized processing block with which the invention may be used preferably also has one or more additional adders for additional processing of the output of the fundamental processing unit, as well as optional pipeline registers and a flexible output stage. Therefore the specialized processing block preferably can be configured for various forms of filtering and other digital signal processing operations. In addition, the specialized processing block preferably also has the capability to feed back at least one of its outputs as an input, which is useful in adaptive filtering operations, and to chain both inputs and outputs to additional specialized processing blocks.

The specialized processing block with which the invention may be used, as described in the above-incorporated patent application, preferably includes flexible rounding circuitry, which preferably allows the user to select between rounding to the nearest integer and rounding to the nearest even. As is known, rounding to the nearest even operates identically to rounding to the nearest integer, except when the remainder is exactly equal to one-half. In rounding to the nearest integer, when the remainder is exactly equal to one-half, the result always is rounded up to the next integer. In rounding to the nearest even, when the remainder is exactly equal to one-half, the result is rounded up if the next integer is even, but rounded down if the next integer is odd. The flexible rounding circuitry preferably also allows the user to select the bit position of the result at which rounding takes place. The location of the flexible rounding circuitry within the specialized processing block preferably also is selectable so that critical timing paths are not affected unnecessarily by rounding operations.

The present invention provides circuitry that preferably performs adding and rounding substantially simultaneously, and in any event preferably within a single clock cycle, to minimize delays in the critical timing paths. It should be noted, however, that such circuitry can be used in any application in which adding and rounding are performed within a critical timing path, and not only in the specialized processing block that is described above and in the above-incorporated patent application.

The present invention implements addition with a form of look-ahead rounding, adding two numbers together both with and without an input rounding bit, and then selecting the correct result at the end of the calculation.

The addition in question is an addition of two multi-bit numbers. In a preferred embodiment, for example, the adder inputs may be two 44-bit numbers. As stated above, the user can select the rounding position. Accordingly, there must be a range of bits encompassing the allowable rounding positions, where two or three numbers may be input, while in other positions only two numbers may be input.

According to one aspect of the present invention, the outputs of the all of the individual bit positions, regardless of whether there are two or three inputs at any particular bit position, are converted to sum and carry vectors for input to a two-input adder. In a preferred embodiment, this is accomplished by using, on each of the positions that may have two or three inputs, a 3:2 compressor to produce a sum vector and a carry vector, and using on each of the positions that may have only two inputs, a 2:2 compressor to produce a sum vector and a carry vector. Although a 2:2 compressor does not perform any actual compression (the number of outputs remains the same as the number of inputs), it converts the inputs to sum and carry vectors that are aligned with the sum and carry vectors from the three-input bit positions.

According to another aspect of the present invention, the compression is formed by a prefix network, such as a Kogge-Stone prefix network, in which each node may be a compressor. In a particularly preferred embodiment of this aspect of the invention, the nodes that perform 2:2 compression are ordinary 2:2 compressors. However, the nodes that may have either two or three inputs, and therefore may perform either 2:2 compression or 3:2 compression, preferably are specialized 3:2 compressors that may simultaneously perform both the 2:2 compression and the 3:2 compression.

Therefore, in accordance with the present invention, there is provided combined adding and rounding circuitry for a programmable logic device, for adding two multi-bit input numbers and rounding a resulting sum to a user-programmable bit position selectable from among a subset of available bit positions. The combined rounding and adding circuitry includes multi-bit addition circuitry, and input circuitry for (a) accepting, in each bit position, bits of the two multi-bit input numbers and (b) accepting, in each bit position in the subset, an additional input of a rounding bit. The input circuitry outputs data to the multi-bit addition circuitry in a format common to each bit position regardless of the number of inputs to the input circuitry at that bit position.

In a method according to the invention, for each bit position outside the subset, a bit from each of the multi-bit numbers is processed to produce a first output having a first number of output bits. For each bit position in the subset, a bit from each of the multi-bit numbers is processed with a rounding input to produce a second output having that first number of output bits. The first and second outputs are combined to produce a rounded sum.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
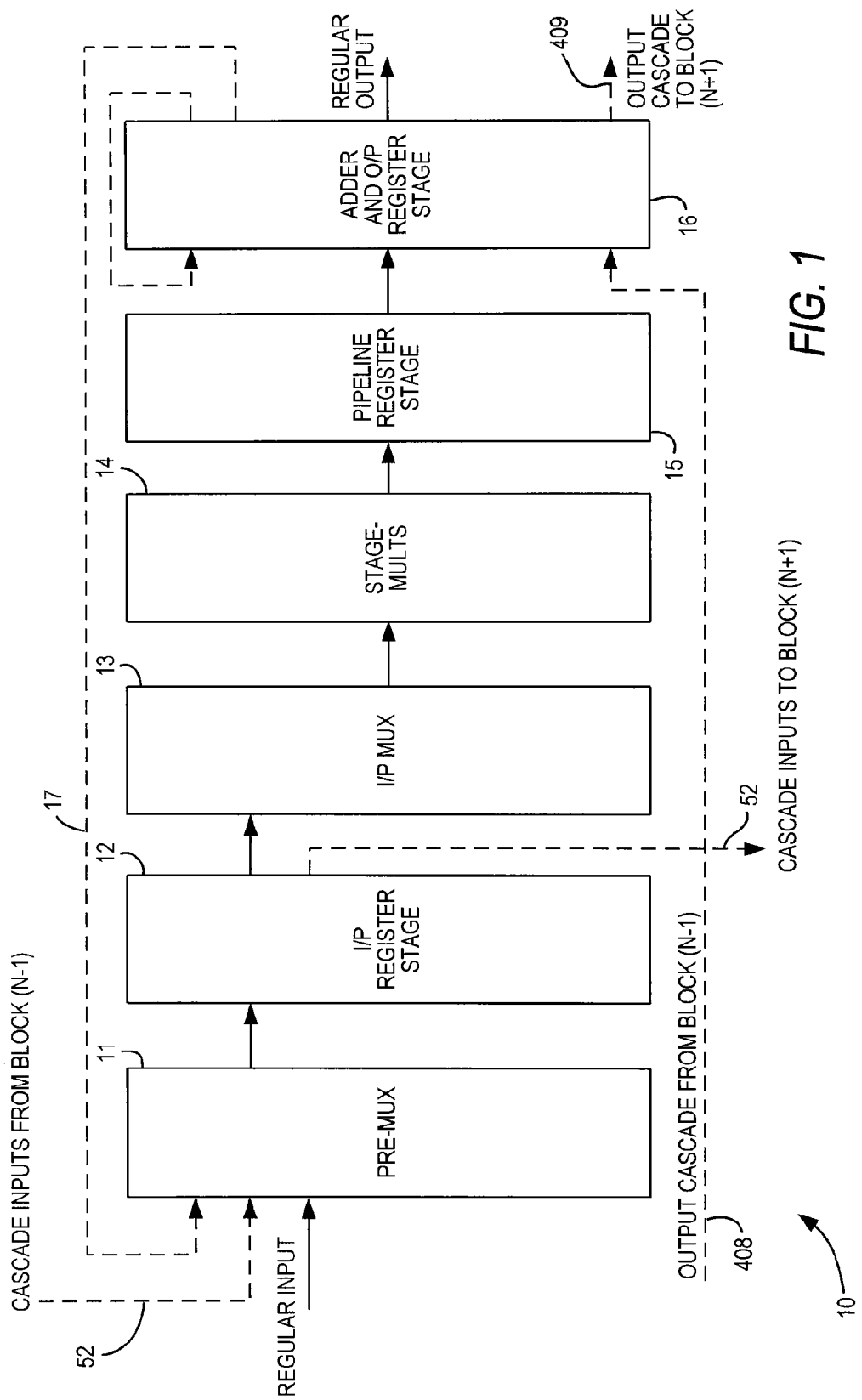
FIG. 1 is a high-level diagram of one preferred embodiment of a specialized processing block with which the present invention may be used.

Rounding is a technique for reducing the precision of a number by removing a lower-order range of bits from that number's representation and possibly modifying the remaining portion of the number to more accurately represent its former value. For example, if the original number has N bits of precision, the rounded number may have only M bits of precision (where N>M), meaning that N–M bits of precision are removed from the number in the process of rounding.

The round-to-nearest method returns the closest number to the original. This is commonly referred to as "round-to-nearest-integer" (RNI), but as it works for numbers less than one as well, "round-to-nearest" is more appropriate. By convention, according to this method an original number lying exactly halfway between two numbers (and therefore having two numbers that are "nearest") always rounds up to the larger of the two. For example, when rounding the 3-bit, two's complement fraction 0.25 (binary 0.01) to the nearest 2-bit two's complement fraction, this method returns 0.5 (binary 0.1). The original fraction lies exactly midway between 0.5 and 0.0 (binary 0.0), so this method rounds up. Because it always rounds up, this method is also called "biased rounding."

The "convergent rounding," or "round-to-nearest-even" (RNE), method also returns the closest number to the original. However, in cases where the original number lies exactly halfway between two numbers, this method returns the nearest even number, which in a binary representation is the one containing a least significant bit of 0. So for the example above, the result would be 0.0, since that is the even-numbered choice as between 0.5 and 0.0. Because it rounds either up or down based on the surrounding values rather than always rounding in the same direction, this method is also called "unbiased rounding."

Some examples are shown in the following table, in which 6-bit numbers are rounded to 4-bits of precision:

| Original number (decimal equivalent) | Sign | First 4 bits odd or even? | Last two bits </> one-half? | RNI Result (decimal equivalent) | RNE Result (decimal equivalent) |
|---|---|---|---|---|---|
| 010111 (23) | + | Odd (LSB = 1) | Greater (.11B = .75) | 011000 (24) | 011000 (24) |
| 001001 (9) | + | Even (LSB = 0) | Less (.01B = .25) | 001000 (8) | 001000 (8) |
| 001010 (10) | + | Even (LSB = 0) | Equal (.10B = .50) | 001100 (12) | 001000 (8) |
| 001110 (14) | + | Odd (LSB = 1) | Equal (.10B = .50) | 010000 (16) | 010000 (16) |
| 110111 (−9) | − | Odd (LSB = 1) | Greater (.11B = .75) | 111000 (−8) | 111000 (−8) |
| 101001 (−23) | − | Even (LSB = 0) | Less (.01B = .25) | 101000 (−24) | 101000 (−24) |
| 110110 (−10) | − | Odd (LSB = 1) | Equal (.10B = .50) | 111000 (−8) | 111000 (−8) |
| 110010 (−14) | − | Even (LSB = 0) | Equal (.10B = .50) | 110100 (−12) | 110000 (−16) |

In any event, either of these forms of rounding involves, for a particular bit position, adding $0.5_{10}$—i.e., 1B in the next most significant place—to the result and then truncating, with the differences being (1) how to handle the situation where the remainder is exactly one-half, and (2) how to handle the fact that in any particular bit position, 1 may or may not be added, which is a user-selectable choice. Rounding circuitry must therefore be able to handle both the possibility that a 1 will be added, and the possibility that it will not. The present invention provides such circuitry.

The invention will now be described with reference to FIGS. 1-12, where FIGS. 1-5 show an example of a specialized processing block in which the invention may be used.

Figure 2:
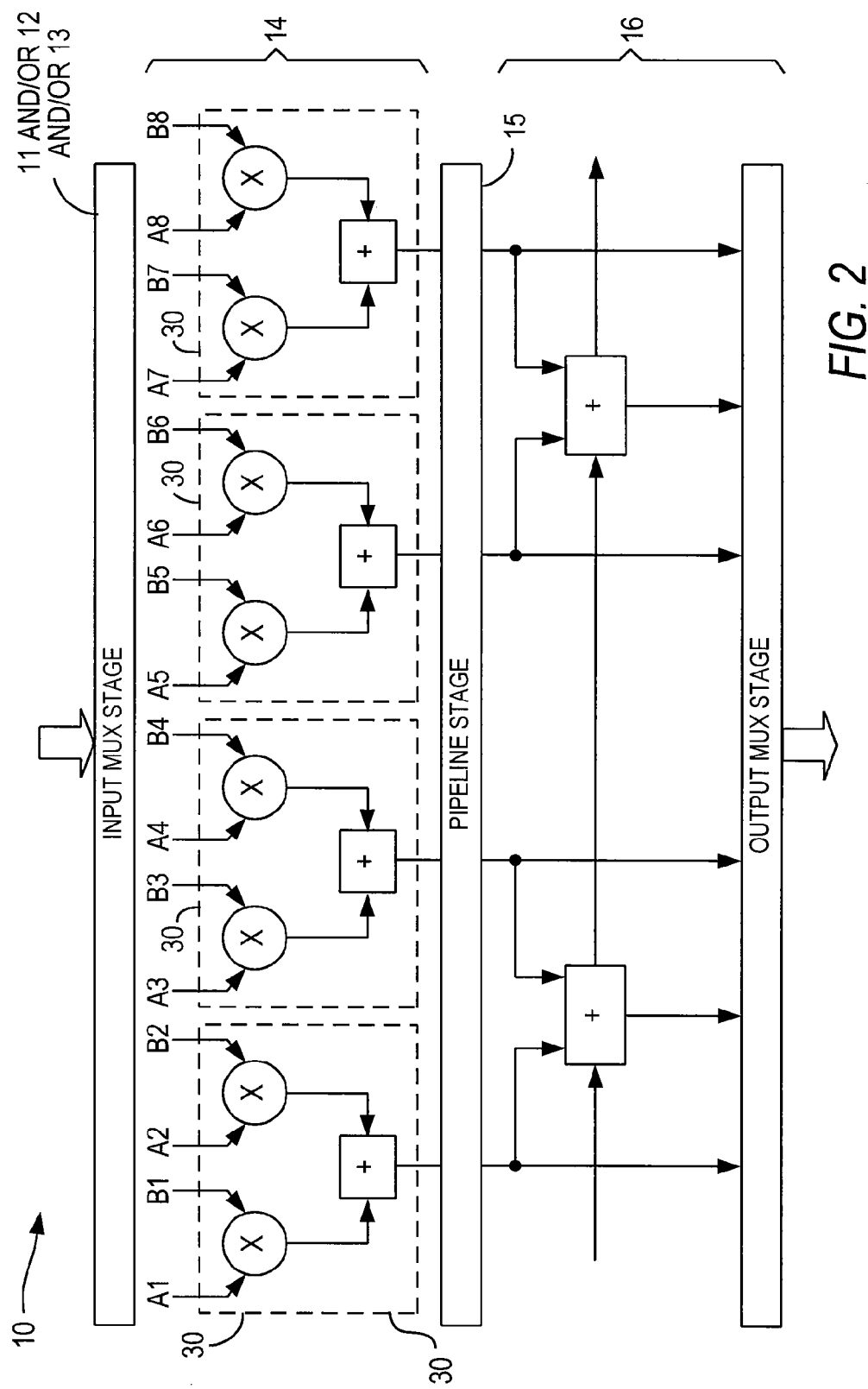
FIG. 2 is a functional diagram of the specialized processing block of FIG. 1.

FIG. 1 shows a high-level diagram of one preferred embodiment 10 of a specialized processing block with which the invention, while FIG. 2 is a functional diagram of the same embodiment 10, it being recognized that rounding logic according to the invention also can be used with any other circuitry that needs to be able to handle the possibility of either two or three inputs at a user-programmable choice of positions.

As seen in FIG. 1, specialized processing block 10 includes optional input pre-MUX stage 11, optional input register stage 12, optional input multiplexing stage 13, multiplication stage 14, optional pipeline register stage 15 and adder/output stage 16.

The function of input pre-MUX stage 11, if provided, is to format the regular inputs, loopback inputs and cascade inputs (see below) into a form suitable for registering.

Regular inputs do not require any specific formatting. Cascade inputs may be a one-register delayed version of a previous input, and therefore may need formatting accordingly. However, such formatting also can be done in programmable logic of the programmable logic device of which specialized processing block 10 is a part, so if formatting of cascade inputs is the only pre-MUX function required, input pre-MUX stage 11 can be omitted or, if provided, bypassed. The loopback input 17 may be arranged so that it is always connected to a particular multiplier or group of multipliers. The formatting performed by input pre-MUX stage 11 may include the direction of particular inputs to particular bit locations depending on the function to be performed by specialized processing block 10. The formatting may be carried out in one embodiment according to a stored table identifying the various possible operations (e.g., simple or complex multiplications of various sizes, shifting operations, rotation operations, etc.) and specifying the corresponding formatting required.

The output of input pre-MUX stage 11, if provided, may be registered by optional input register stage 12. If there in no input pre-MUX stage 11, then the input register function, if needed, can be performed in the programmable logic portion of the programmable logic device of which block 10 is a part. Therefore, input register stage 12 is considered optional. Input register stage 12, even if provided, preferably can be optionally bypassed in cases where unregistered outputs are needed or desired.

Input multiplexing stage 13, if provided, takes registered or unregistered inputs from input pre-MUX stage 11 and inputs potentially from elsewhere in the programmable logic device and formats the data for the different operational modes. In that respect it is similar to input pre-MUX stage 11, and therefore frequently if one of input pre-MUX stage 11 and input multiplexing stage 13 is provided, the other will not be provided.

As one example of the type of formatting performed by input pre-MUX stage 11 or input multiplexing stage 13, consider an 18-by-18 complex multiplication in which:

Real Result=$Re[(a+jb)\times(c+jd)]=(ac-bd)$

Imag Result=$Im[(a+jb)\times(c+jd)]=(ad+bc)$

This complex operation requires four 18-by-18 multiplications and hence eight 18-bit inputs, but because there are only four unique 18-bit shared inputs, input multiplexing stage 13 will take the inputs a, b, c and d and perform the necessary duplication so those four inputs are properly routed to the correct multiplier inputs for each of the real and imaginary calculations. Similarly, for 9- and 12-bit mode operations, input pre-MUX stage 11 and/or input multiplexing stage 13 ensures correct alignments of the input bits in order to obtain correct results.

Multiplication stage 14 preferably includes a plurality of fundamental processing units as described above. In a preferred embodiment, each specialized processing block 10 (see FIG. 2) includes four fundamental processing units 30, meaning that it can perform up to eight multiplications in groups of two multiplications that are summed together. In that embodiment, the fundamental processing units in specialized processing block 10 preferably are grouped into identical half-blocks, so that each half-block in its own right can be considered a specialized processing block within the invention.

Each fundamental processing unit preferably includes the functionality for a sum of two 18-by-18 multiplications. The fundamental processing units preferably are all identical, but in some embodiments, it is possible to provide a negation function on only some inputs of some multipliers, as maybe required for, e.g., complex multiplication where, as is apparent above, subtraction may be required. Alternatively, the negation function may be provided in the adder portion of the fundamental processing unit, so that one or more adders can also perform subtraction.

Figure 3:
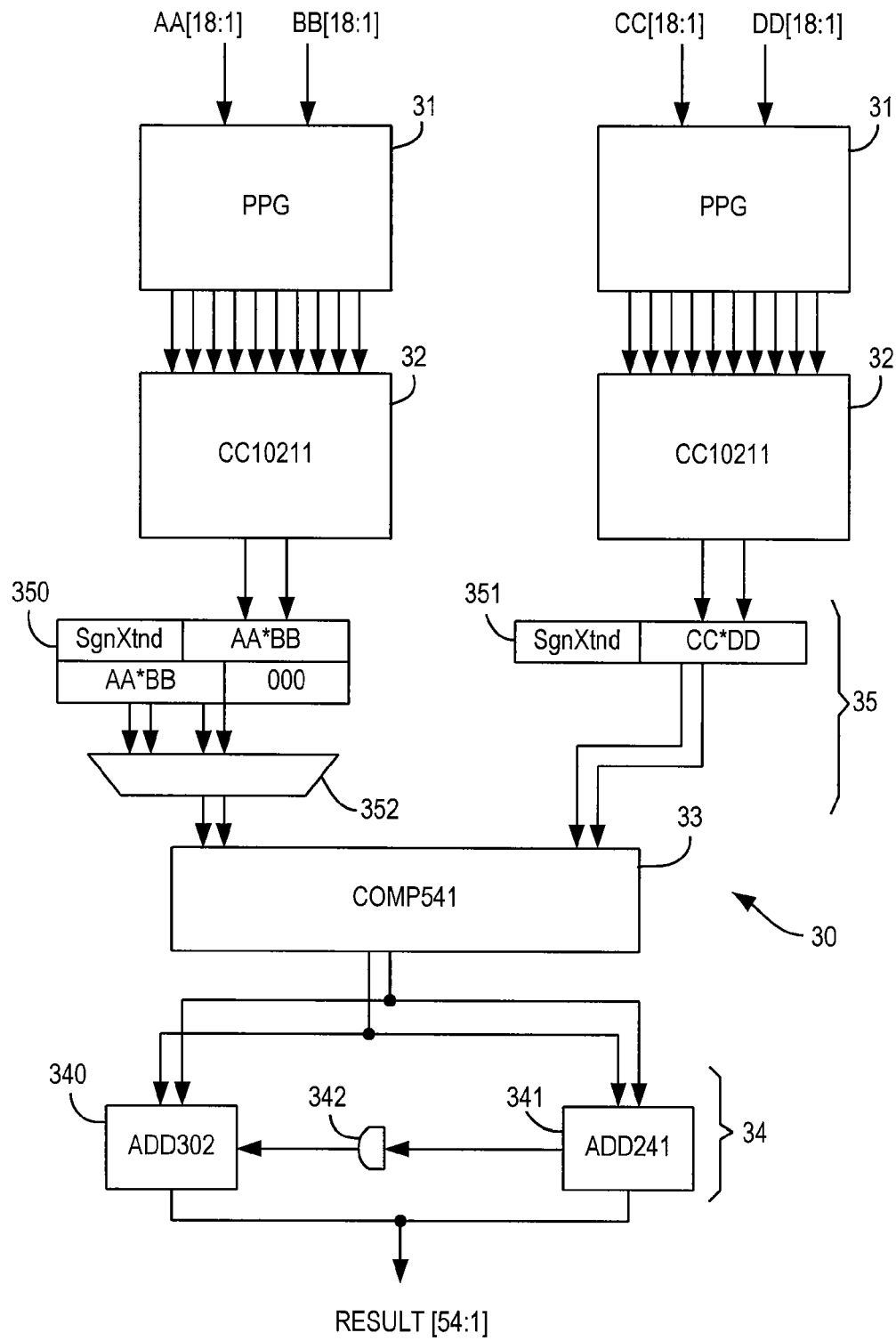
FIG. 3 is a block diagram of a preferred embodiment of a fundamental processing unit for a specialized processing block with which the present invention may be used.

The structure of a preferred embodiment of a fundamental processing unit is shown in FIG. 3. Each fundamental processing unit 30 preferably supports a sum of two 18-by-18 multiplications and preferably includes two partial product generators 31, two ten-vector-to-two-vector compressors 32, a 4-to-2 compressor 33, and two carry-propagate adders 34. Adders 34 preferably include one 30-bit adder 340 and one 24-bit adder 341, which are selectably connectable by a control signal 342. For smaller multiplications such as 9-by-9 or 12-by-12, only 24 bits are required, so the two adders can be disconnected to allow two independent multiplications. For larger multiplications such as 18-by-18, the two adders 34 should be linked as a single adder.

Each partial product generator 31 preferably creates nine 20-bit signed Booth-encoded vectors (Booth-encoding is a known technique that can reduce the number of partial products), as well as a 17-bit unsigned carry vector (negative partial products are in ones-complement format, with the associated carry-in bit in the carry vector). An additional 19-bit signed partial product may be generated in the case of unsigned multipliers (which preferably will always be zero for signed multipliers). Although preferably up to 11 vectors may be generated, the carry bits preferably can be combined with the partial product vectors, requiring only 10 vectors to be compressed.

The partial products preferably are compressed down to two 39-bit vectors (36 bits plus sign extension bits). Any sign extensions should be preserved properly past the 36-bit 18-by-18 multiplier boundary, so that any sign extensions can be valid up to the 72-bit 36-by-36 multiplier boundary (in a case where two fundamental processing units are combined to implement a 36-by-36 multiplication as described below). After compression, the results preferably are processed in mux-and-shift circuitry 35, which preferably include combinatorial logic where any sign-extension, zero-filling or shifting of the results before addition, as may be required depending on the operation being performed, can be accomplished prior to final combination of the results in 4-to-2 compressor 33 and carry-propagate adders 34. For each of circuits 350, 351, the inputs preferably are two 39-bit vectors for a total of 78 input bits, while the outputs preferably are two 54-bit vectors for a total of 108 bits. The extra thirty bits are the result of sign extension, zero-filling, and or shifting. Multiplexer 352 indicates a selection between sign extended or zero-filled results. The four 54-bit vectors are input to compressor 33 which outputs two 54-bit vectors, which are added in adders 34 to produce a 54-bit output.

As discussed above, because the partial products from both multipliers are added at once, the two multipliers of a fundamental processing unit cannot be used for two independent multiplications, but a single multiplication can be carried out by zeroing the inputs of the second multiplier.

For smaller multiplications, independent subset multipliers (9-by-9 and 12-by-12 cases) may be handled as follows:

For two 9-by-9 multiplications, the first 9-by-9 multiplication preferably is calculated using the most significant bits (MSBs) of the first multiplier (on the left in FIG. 3), and the second 9-by-9 multiplication preferably is calculated using the least significant bits (LSBs) of the second multiplier (on the right in FIG. 3). The MSBs of the right multiplier are filled with the sign extensions of the corresponding values, as appropriate. The outputs of the left multiplier (sum and carry vectors) are left-shifted by 18 bits. The two multiplier outputs preferably are then compressed together and the two resulting final vectors are then added with the two adders 34, which are not connected for this operation. The first 9-by-9 result preferably will be output on the MSBs of the left (30-bit) adder 340, while the second 9-by-9 result preferably will be output on the LSBs of the right (24-bit) adder 341.

Independent 12-by-12 multiplications can be calculated in a manner similar to a 9-by-9 multiplication, using the MSB/LSB method.

In both cases, preferably the right multiplier outputs are zeroed above 24 bits to prevent any interference with the independent left multiplier result.

In the case of summed multiplications, regardless of the precision, all inputs preferably are shifted to occupy the MSBs of the multipliers used, and the output vectors preferably are not shifted. The output vectors, however, preferably are fully sign-extended, so that sign-extension out of the adders 34 can be used for the full width of the accumulator (below).

Preferably, for complex multiplications and other operations that require subtraction of products, the adder inputs can be negated (effectively making the adder an adder/subtractor). Alternatively, however, one or more of the multipliers can be provided with the ability to selectively negate its output vectors, by inverting the input (ones' complement), and adding the multiplicand to the result. The multiplicand addition can be performed in the compression of the partial products, so that the negation can be implemented before adders 34.

Pipeline register stage 15, which preferably may be bypassed at the user's option, preferably allows outputs of multiplication stage 14 to be registered prior to further addition or accumulation or other processing.

Figure 4:
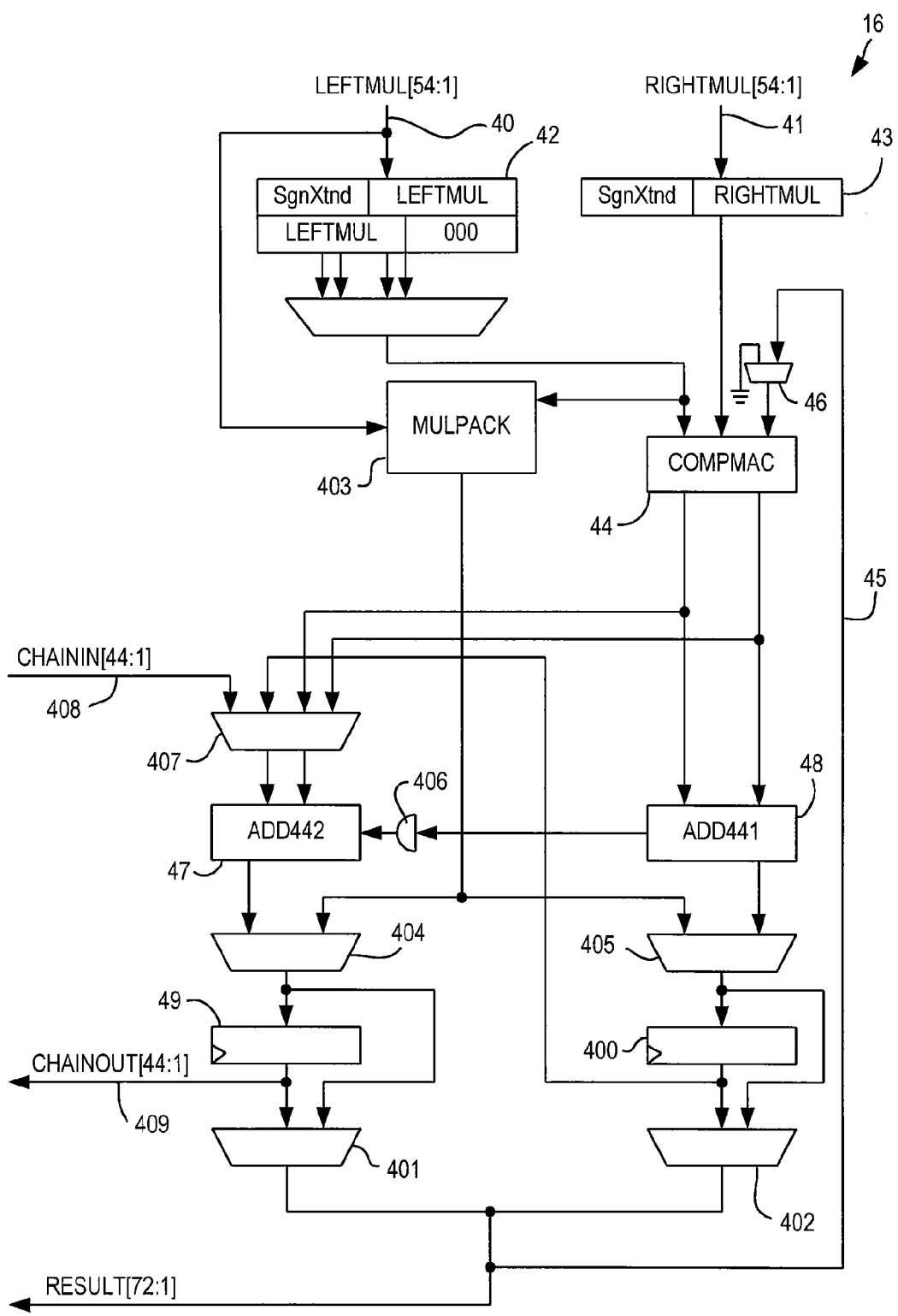
FIG. 4 is a preferred embodiment of an output stage of a specialized processing block with which the present invention may be used.

Adder/output stage 16 preferably selectively shifts, adds, accumulates, or registers its inputs, or any combination of the above. Its inputs preferably are the outputs of the two fundamental processing units in specialized processing block 10. As seen in FIG. 4, those two inputs 40, 41 are input to respective register/shifter units 42, 43, which optionally may shift or sign extend inputs 40, 41. In a preferred embodiment, each of inputs 40, 41 is a 54-bit vector, which is shifted or sign-extended to create a respective 72-bit vector.

The outputs of units 42, 43 preferably are input to a 3:2 compressor 44, along, preferably, with the output 45 of stage 16 itself. This feedback provides an accumulation function to specialized processing block 10. Preferably, the fed-back output 45 passes through multiplexer 46, which can alternatively select a zero (e.g., ground) input when accumulation is not necessary or desired.

The outputs of compressor 44 are provided (through appropriate multiplexers as described below) to two adders 47, 48, which may be chained together under programmable control, depending on the use to which they are to be put, as described below. The outputs of adders 47, 48 preferably may be registered in registers 49, 400 or not, as determined by multiplexers 401, 402. Registered or not, outputs 47, 48 preferably make up the output vector of specialized processing block 10. As an alternative path, multiplexers 403, 404, 405 allow adders 47, 48 to be bypassed where the outputs of fundamental processing units 30 are to be output without further processing.

In the case, described above, where each fundamental processing unit 30 can perform a sum of two 18-by-18 multiplications, two fundamental processing units 30 can perform a 36-by-36 multiplication, which, as is well known, can be decomposed into four 18-by-18 multiplications. In such a case, two compressed 72-bit vectors preferably are output by compressor 44 and preferably are added together by the two 44-bit adders 47, 48, which are programmably connected together for this mode by AND gate 406. The upper 16 bits may be ignored in this mode.

In other modes with narrower outputs, where adders 47, 48 need not be connected together, adders 47, 48 optionally may be arranged to chain the output of specialized processing block 10 with the similar output of another specialized processing block 10. To facilitate such a mode, the output of register 400, for example, may be fed back to 4:2 multiplexer 407, which provides two inputs to adder 47. The other inputs to multiplexer 407 may be the two vectors output by compressor 44 and chain-in input 408 from another specialized processing block 10, which may be provided via chain-out output 409 from register 49 of that other specialized processing block 10.

Thus, in chaining mode, 44-bit adder 48 may be used to add together the results within one of specialized processing blocks 10—configured, e.g., as a single multiplier, a sum of multipliers, or an accumulator.—with the results of the previous block. By using multiplexer 407 to select as inputs to adder 47 the output of adder 48 and the output of another specialized processing block 10, the output of the current specialized processing block 10 can be the chained sum of the outputs of the current and previous specialized processing blocks 10. If the chaining mode is used, only a 44-bit accumulator is available, which will still give a 6-bit to 8-bit guard band, depending on the number of multipliers. However, as is apparent, the chaining mode is not available for the 36-bit mode, in which both adders 47, 48 are needed to obtain the result of a single specialized processing block 10.

The output paths may be slightly different depending on the mode of operation. Thus, multiplexers 401, 402 allow selection of registered or unregistered outputs of adders 47, 48. It will be appreciated, however, that, as shown, registered outputs preferably are used in cascade or chained mode.

In addition, at least one output may be looped back, as at 17, to an input of specialized processing block 10. Such a loopback feature may be used, for example, if specialized processing block 10 is programmably configured for adaptive filtering. Although multiple loopbacks may be provided, in a preferred embodiment, one loopback 17 to single multiplier or group of multipliers is provided.

Figure 5:
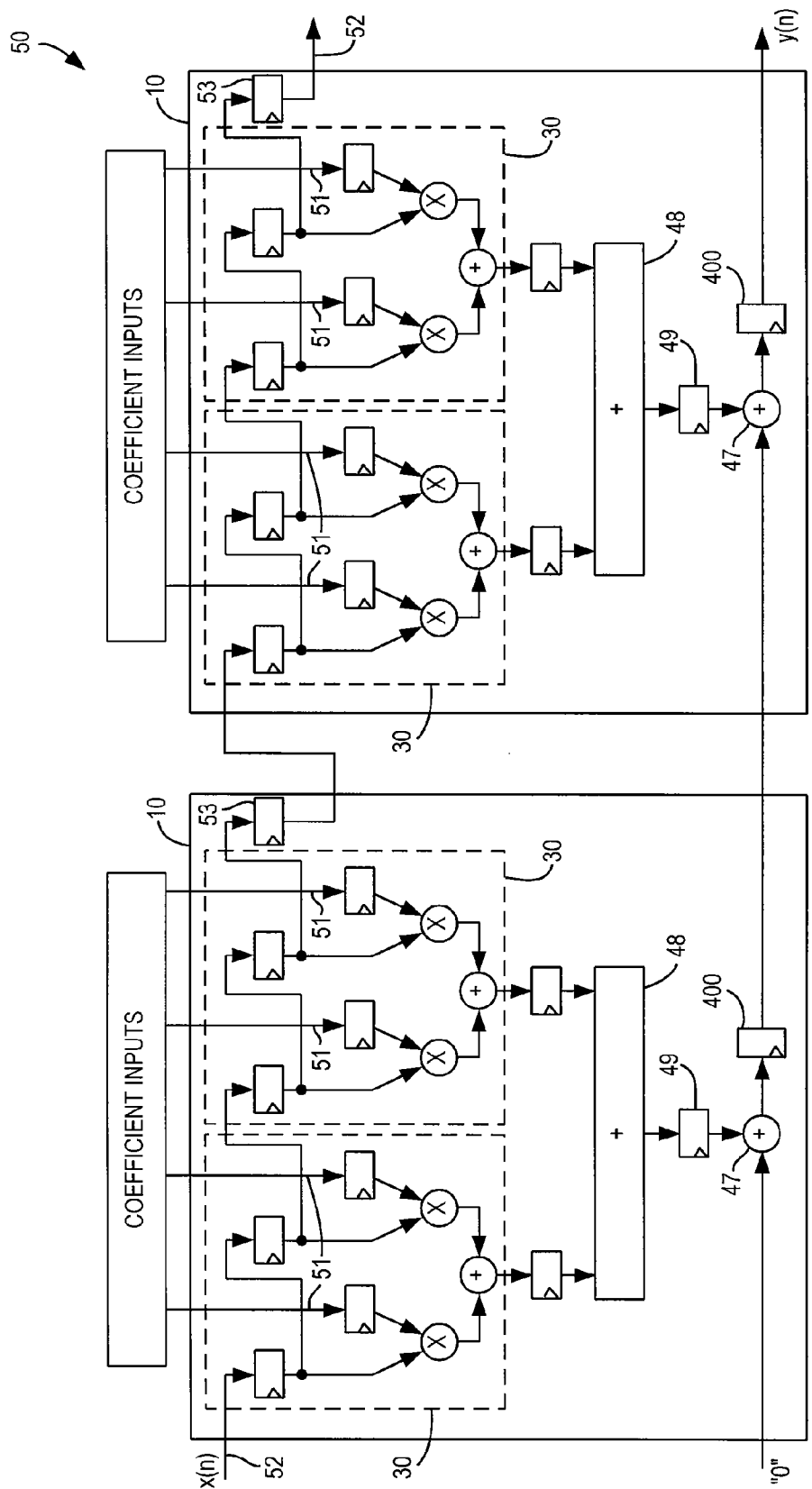
FIG. 5 is a functional diagram of a specialized processing block with which the present invention may be used, configured as part of a finite impulse response filter.

The specialized processing block 10 of the present invention may be programmably configured as a long chain finite impulse response (FIR) filter. As shown in FIG. 5, four fundamental processing units 30 are configured as part of such a FIR filter 50. As discussed above, this may be considered to be either one or two specialized processing blocks 10. As shown, each of adders 48 is used to add the results of four multiplications, with adders 47 used in the chaining or cascade mode described above to add together the outputs of adders 48 (as well, possibly, as the outputs of adders 48 of other specialized processing blocks 10) to form a long FIR filter. The coefficients of the FIR filter are input at 51, while the data to be filtered are input via register chain 52, preferably formed in one of input pre-MUX stage 11, input register stage 12 or input multiplexing stage 13. To account for delay introduced by the output cascade chain, at least one extra delay 53 (e.g., in the form of an extra register) preferably is provided in input cascade chain 52. Preferably, the number of delays corresponds to the number of adders 47 or, more particularly, output registers 409 for which delays 53 compensate. Generally, this would amount to one delay 53 for each pair of fundamental processing units 30. As discussed above, although in a preferred embodiment two fundamental processing units 30 make up a half-block, they also could be considered a specialized processing block 10 in their own right.

As discussed above, the present invention provides rounding circuitry that may be used in an environment such as specialized processing block 10. As discussed, the rounding circuitry preferably allows the user to select between round-to-nearest mode and round-to-nearest-even mode. Truncation—i.e., always rounding down—also may be provided as an option. Similarly, always rounding up may be provided as an option. In addition, the rounding circuitry preferably allows the user to select the bit at which rounding will occur.

The calculation of round-to-nearest is trivial as it involves simply adding one-half (i.e., adding 1 in the next most significant position after the rounding position) and then truncating the result (i.e., replacing all values after the rounding position with zeroes). The calculation of round-to-nearest-even is more complicated, as it involves determining whether the value of the bits beyond the rounding position is exactly one-half or not. As discussed above, in either case the circuitry needs to be able to accept an additional input at any rounding position which the user is permitted to select.

Figure 6:
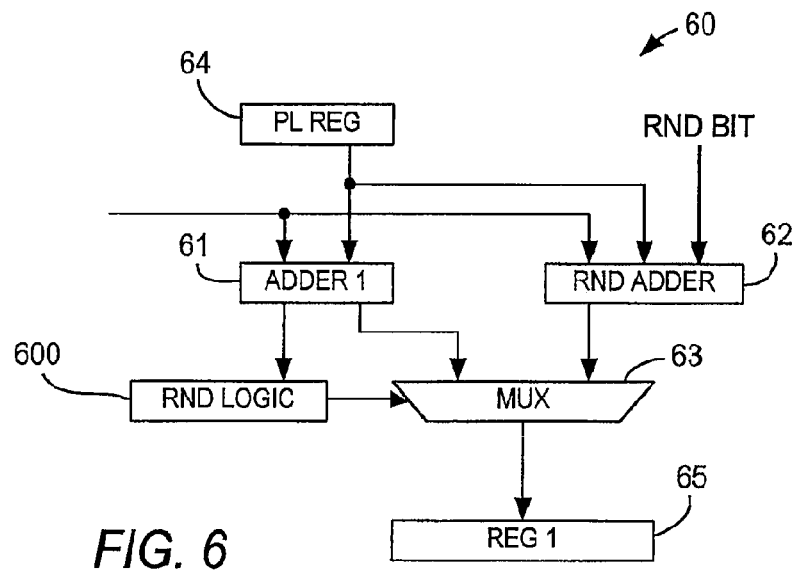
FIG. 6 is a schematic diagram of a portion of a specialized processing block with which the present invention may be used showing a location of rounding logic in accordance with one embodiment of the present invention.

Thus, in embodiment 60 of FIG. 6, which may be programmably implemented in specialized processing block 10, instead of waiting for rounding logic 600 before deciding between addition 61 and addition 62, addition 61 (without input of the rounding bit) and addition 62 (with input of the rounding bit) are carried out simultaneously and the result of rounding logic 600 is used to control multiplexer 63, which selects between adders 61, 62. This look-ahead rounding decreases the time needed to perform rounding operations between registers 64 and 65, and therefore increases the maximum permissible clock speed.

Figure 7:
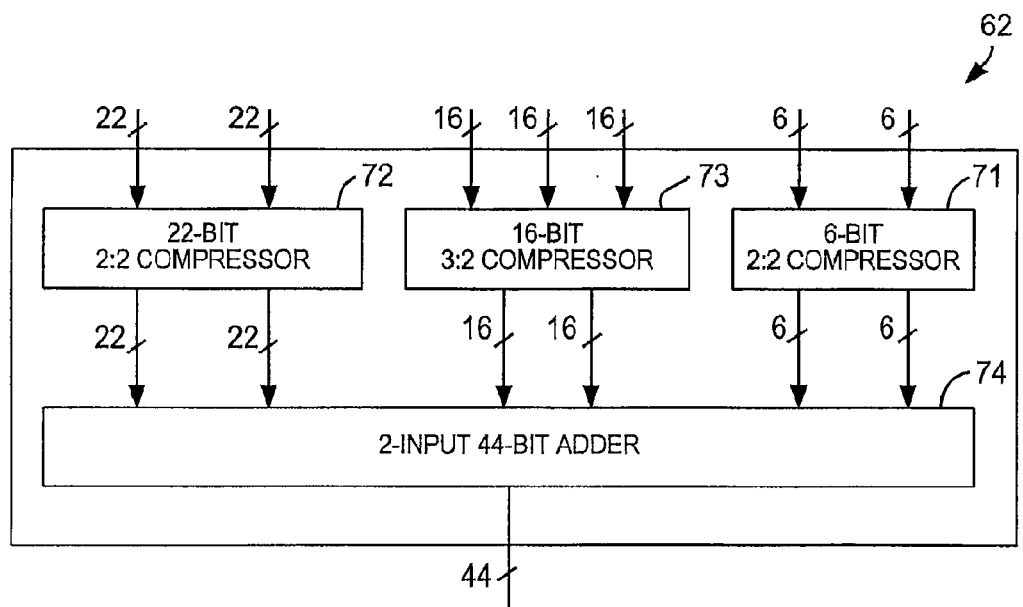
FIG. 7 is schematic diagram showing detail of the rounding adder in the rounding logic of FIG. 6.

FIG. 7 shows how adder 62 may be implemented to accept handle the possibility of either two or three inputs in any of the permissible user-selected rounding positions. In the embodiment of FIG. 7, the addition to be performed is of two 44-bit numbers, with the user allowed to select any of 16 positions between the seventh and twenty-second positions to be the rounding position. Thus, the first (least significant) six positions and the last (most significant) 22 positions accept only two inputs, but any one of the seventh through twenty-second positions may accept either two or three inputs.

As seen in FIG. 7, the six least significant positions accept two 6-bit vectors into 6-bit 2:2 compressor 71, and the 22 most significant positions accept two 22-bit vectors into 22-bit 2:2 compressor 72. For the 16 positions where there may be three inputs, 16-bit 3:2 compressor 73 accepts three 16-bit vectors—two vectors represent those 16 bits in the numbers to be added, and one vector represents the rounding bit (only one of those 16 bits is a one while the others are 0). All three compressors output two vectors—sum and carry—which are input to a conventional 44-bit two-input adder 74. As discussed above, while the 2:2 compressors 71, 72 do not perform any actual compression, they convert the data at the 28 two-input positions to a sum-and-carry vector format that lines up with the output of 3:2 compressor 73.

Figure 8:
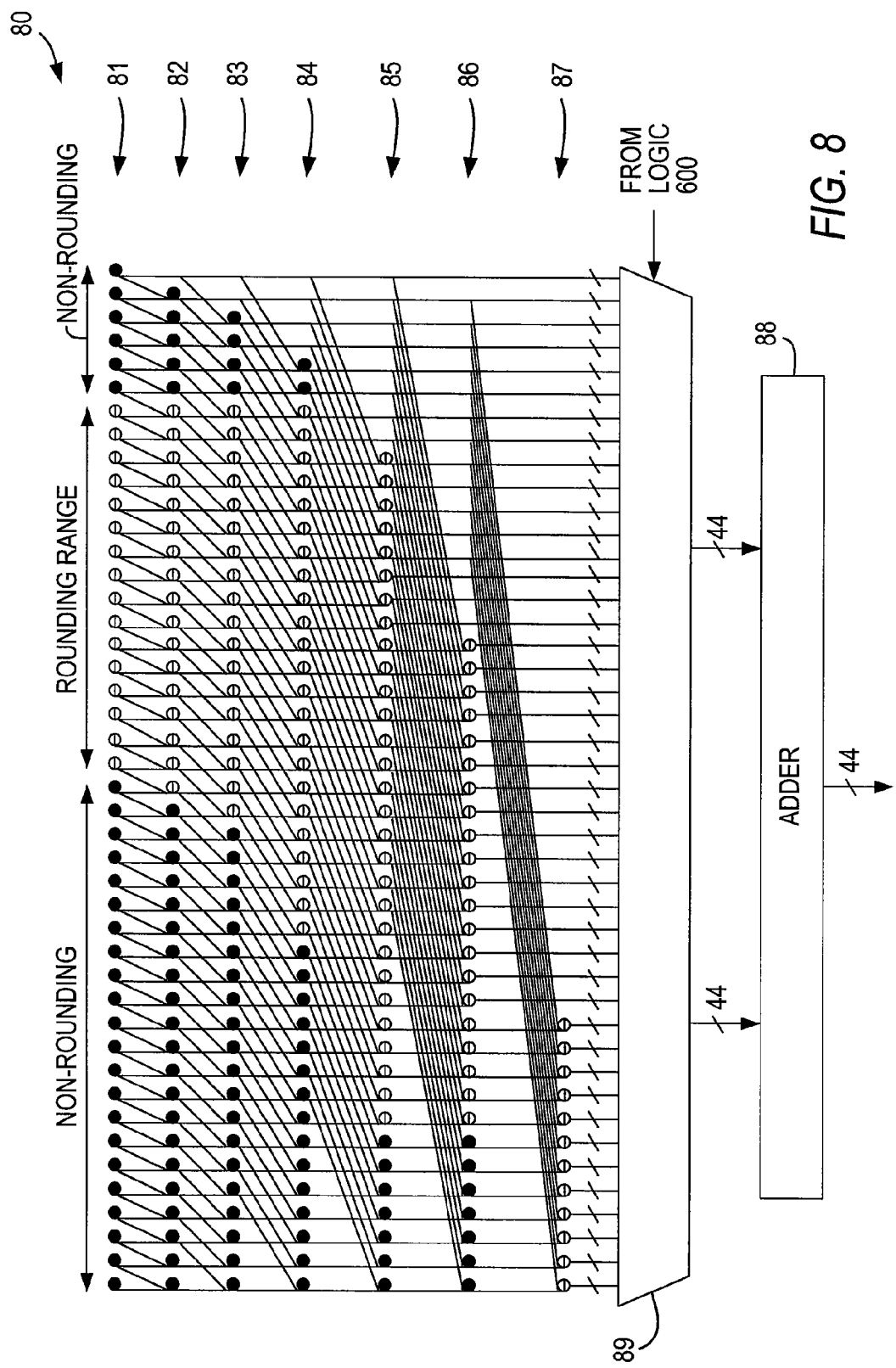
FIG. 8 is a diagram of a Kogge-Stone prefix network that may be used to implement the present invention.

In another aspect of the invention, instead of implementing the addition with two parallel conventional adders as in FIGS. 6 and 7, the addition may be implemented using a prefix network, such as the modified Kogge-Stone prefix network 80 shown in FIG. 8, followed by an adder 88. As is well known, a Kogge-Stone prefix network is one of many techniques for performing carry look-ahead operations. This allows calculation of carry values for all bit positions without having to use, for example, a time-consuming ripple-carry adder.

Using the modified prefix network in accordance with the present invention, the prefix network and one full adder can replace both adder 61 (including compressors 71-73) and adder 62. This is preferably accomplished by providing, in each of those positions of the prefix network that may accept three inputs, a modified three-input compressor that can simultaneously perform 2:2 compression and 3:2 compression.

In the representation of FIG. 8, each node in the first, or input, level 81 is a compressor. The nodes indicated by solid dots are 2:2 compressors. The nodes corresponding to positions that the user can designate as the rounding position are indicated by hashing and can simultaneously perform 2:2 compression and 3:2 compression. Level 81 corresponds to compressors 71-73.

Figure 9:
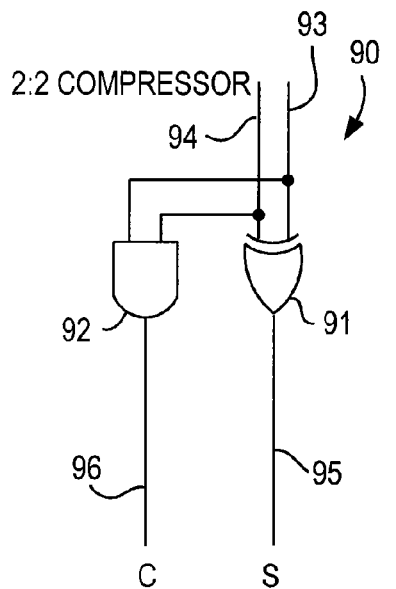
FIG. 9 is a schematic diagram of a conventional 2:2 compressor.
Figure 10:
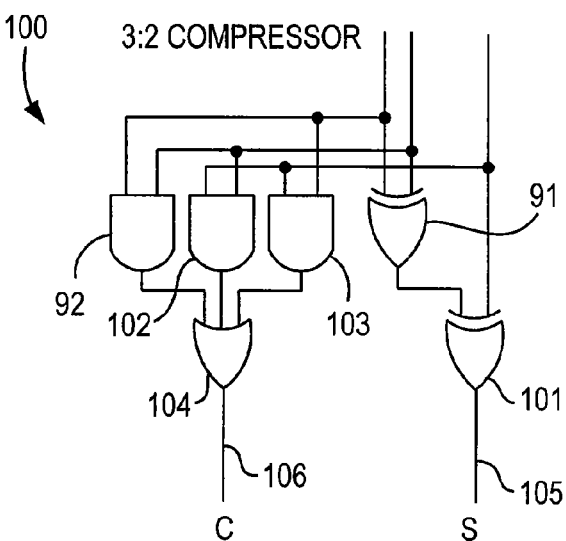
FIG. 10 is a schematic diagram of a conventional 3:2 compressor.

FIG. 9 shows the structure of a known 2:2 compressor 90 including an XOR gate 91 and an AND gate 92, which takes two inputs 93, 94 and produces sum (S) and carry (C) vectors 95, 96. FIG. 10 shows the structure of a known 3:2 compressor 100 including two XOR gates 91, 101, and three AND gates 92, 102, 103 that are ORed together by OR gate 104. XOR gate 101 and OR gate 104 provide the sum (S) and carry (C) vector outputs 105, 106, respectively.

Figure 11:
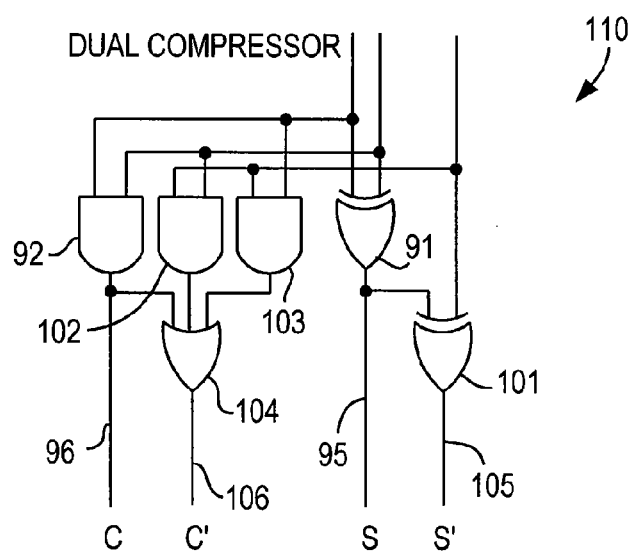
FIG. 11 is a schematic diagram of a compressor that simultaneously performs 2:2 compression and 3:2 compression.

FIG. 11 shows a modified 3:2 compressor 110 according to the present invention in which XOR gate 101 and OR gate 104 provide the sum (S') and carry (C') vector outputs 105, 106 for 3:2 operation as in FIG. 10, while XOR gate 91 and AND gate 92 provide the sum (S) and carry (C) vector outputs 107, 108 for 2:2 operation as in FIG. 9. In accordance with the invention, each node of prefix network level 81 that may accept three inputs is implemented using compressor 110, allowing prefix network 80 to simultaneously calculate the two-input case as in adder 61 and the three-input case as in adder 62.

In subsequent levels 82-87 of prefix network 80, each node preferably includes Generate (G) and Propagate (P) circuitry. G and P circuitry can be described as follows: Two input bits are used—an "A" bit from a first vector, and a "B" bit from a second vector. A single-bit Generate circuit outputs 1 if a carry is generated—i.e., if A OR B=1. A single-bit Propagate circuit outputs 1 if a carry-in is propagated out—i.e., if A AND B=1. The function of prefix network 80 is to calculate a carry bit for each position along the two input vectors, and it does this by combining single-bit G and P circuitry into multi-bit G and P circuitry. Each node in levels 82-87 contains multi-bit G and P circuitry, which is constructed out of the single-bit G and P circuitry as follows: The output of a G node when it is being fed by G and P nodes is $G_{out}=G2+G1P1$, where G2 is from the node immediately above, and G1 is from the node above and to the right. The output of a P node when it is being fed by G and P nodes is $P_{out}=P2P1$, where P2 is from the node immediately above, and P1 is from the node above and to the right. On each successive level, the G and P nodes are combined with multi-bit G and P circuitry, until each position along the vector contains a G and P result that is a combination of all inputs at the top of the prefix network, for all bit positions to the right of it. At the bottom of the network, carry bits for each position can be calculated from the G and P results. Prefix network 80 of FIG. 8 (levels 82-87) is a Kogge-Stone network, but any other network topology can be adapted to this method.

In levels 82-87, each node that is hatched has two sets of multi-bit G and P circuits—one from the rounding=0 (i.e., from the 2:2 compressors in the rounding range) and one from the rounding=1 (i.e., from the 3:2 compressors in the rounding range). At the bottom of the prefix network two carry vectors are output—one for round=0 and one for round=1, although to the right of the rounding range there is only one carry vector. One of the two carry vectors is selected by round logic similar to round logic 60, e.g., using multiplexer 89 before adder 88. The selected carry vector is added with the A and B vectors. A single bit add is just A XOR B XOR CARRY, and therefore adder 88 may be a simple XOR. Levels 82-87 plus the adder 88 correspond to adder 74.

Figure 12:
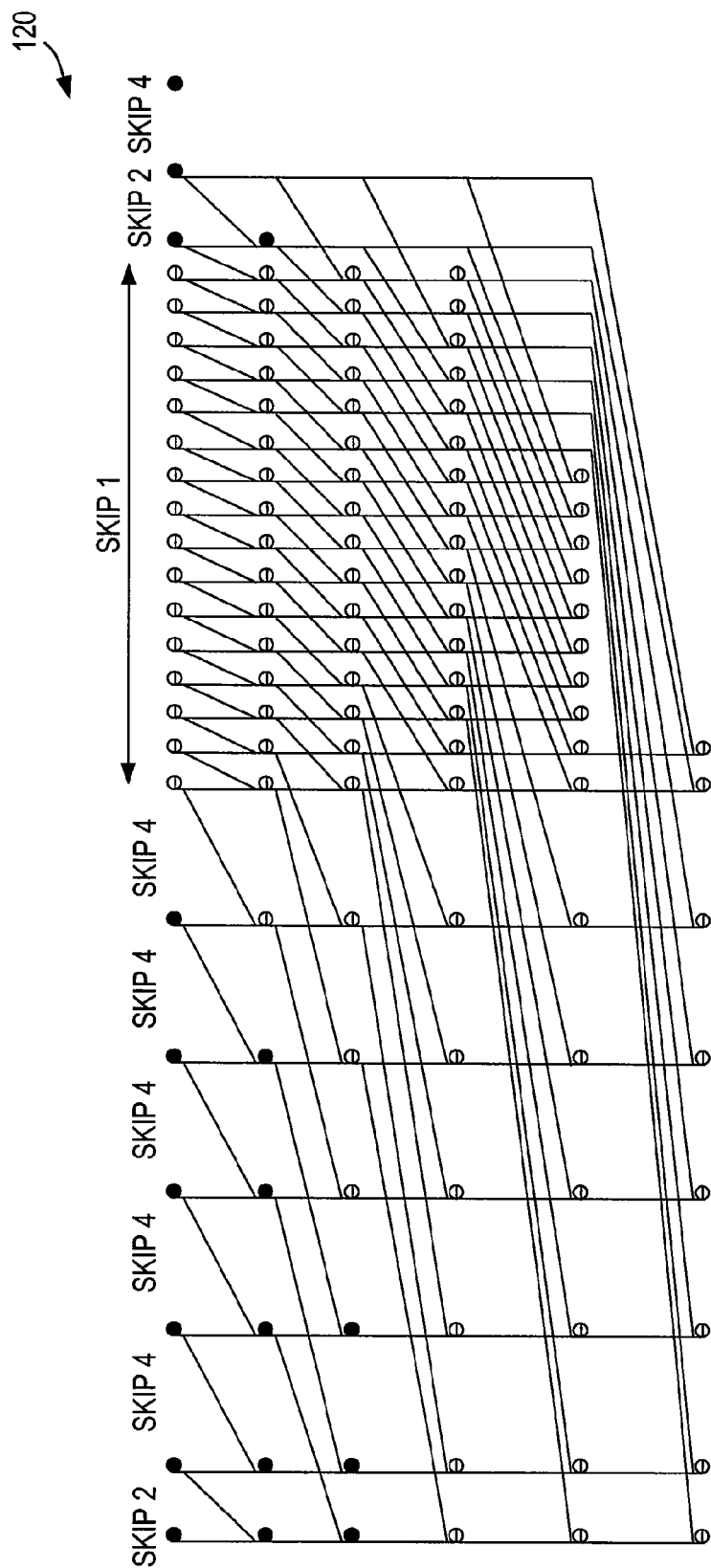
FIG. 12 is a diagram of a sparse Kogge-Stone prefix network according to an alternate embodiment of the invention.

As seen in FIG. 12, a sparser prefix network 120 can be provided in place of prefix network 80. In prefix network 120, every bit position in the permissible round range is populated, because the user may select any of those positions as the round position and therefore prefix network 120 accommodates the possibility of the round bit being input to any of those positions. However, outside the round range, prefix network 120 is sparsely populated. Thus, in the 44-bit example shown of this embodiment, with a round range from bit 7 through bit 22, bits 23 through 44 preferably are populated only every fourth bit (except that from bit 42 to bit 44 is only a two-bit skip). Similarly, at the least significant bit end of the network, bits 1 and 5 are populated (with a four-bit skip from bit 1 to bit 5 and a two-bit skip from bit 5 to bit 7). Rather than three-input adder 88 as in the fully populated network 80, a 4-bit adder is required to add 4 bits of A, and 4 bits of B, with a carry-in provided by prefix network 120. A carry may be generated locally in the 4-input adder which may be a known adder such as a ripple-carry adder, carry look-ahead adder, etc.

While a 44-bit addition is used as an example in FIGS. 6-12, it is only an example, and the invention applies to addition operations of any size. Similarly, while a 16-bit round range is shown in the examples, the round range could encompass any subset of the total number of bit positions (including all of the bit positions). The number of bits encompassed by 3:2 compressor 73, or the number of positions in the first level 81, 121 of prefix network 80, 120 that include modified 3:2 compressor 110, would be adjusted accordingly.

Thus it is seen that improved rounding capabilities for a specialized processing block for a programmable logic device, where user programming requires rounding circuitry to be flexible and where timing constraints should be observed, have been provided.

Figure 13:
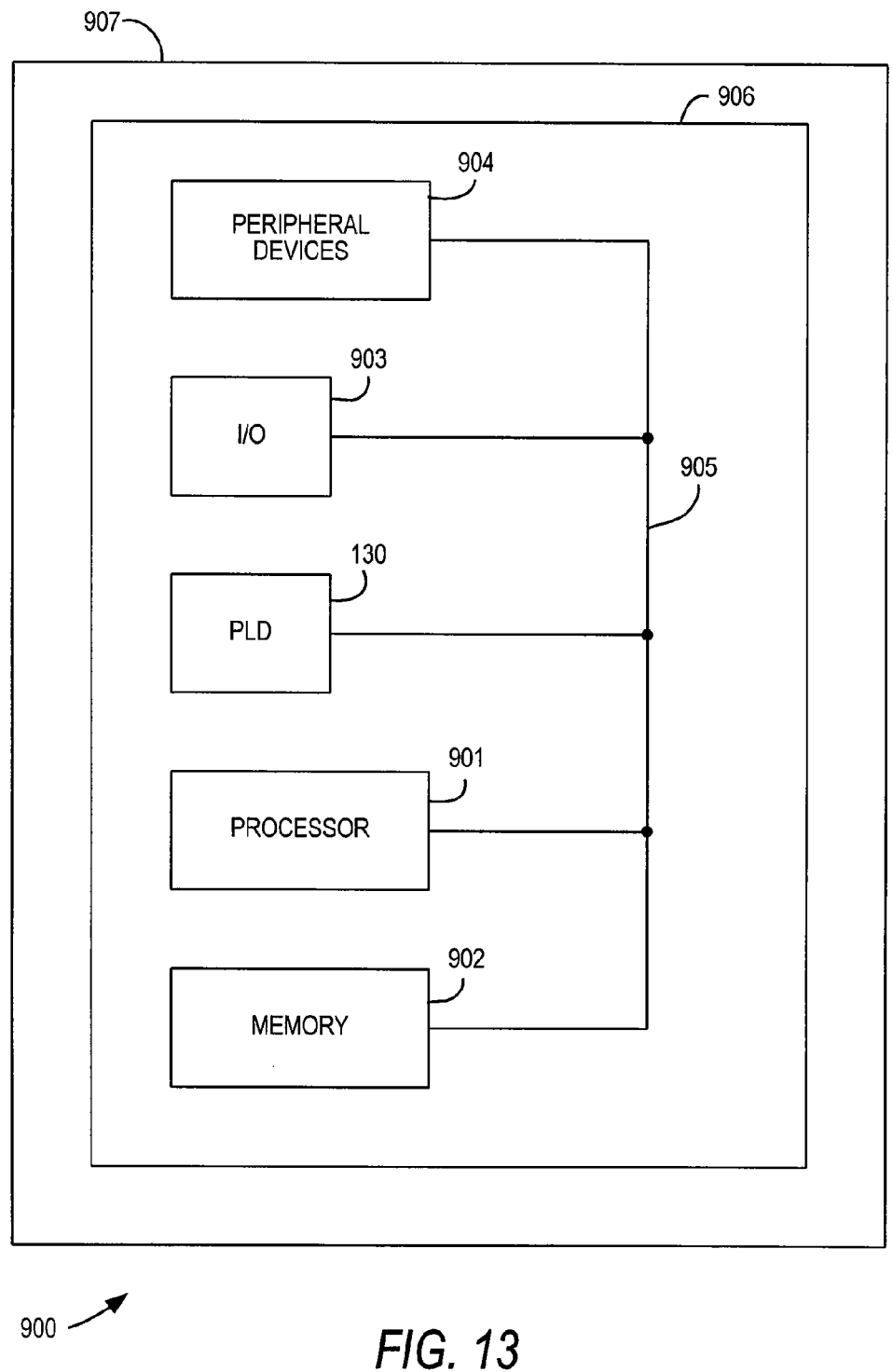
FIG. 13 is a simplified block diagram of an illustrative system employing a programmable logic device incorporating the present invention.

A PLD 130 incorporating such circuitry according to the present invention may be used in many kinds of electronic devices. One possible use is in a data processing system 900 shown in FIG. 13. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 120 can be used to perform a variety of different logic functions. For example, PLD 120 can be configured as a processor or controller that works in cooperation with processor 901. PLD 120 may also be used as an arbiter for arbitrating access to a shared resources in system 900. In yet another example, PLD 120 can be configured as an interface between processor 901 and one of the other components in system 900. It should be noted that system 900 is only exemplary, and that the true scope and spirit of the invention should be indicated by the following claims.

Various technologies can be used to implement PLDs 130 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Combined adding and rounding circuitry for a programmable logic device, for adding two multi-bit input numbers and rounding a resulting sum to a user-programmable bit position selectable from among a subset of available bit positions, said combined rounding and adding circuitry comprising:

multi-bit addition circuitry; and input circuitry for (a) accepting, in each bit position, bits of said two multi-bit input numbers and (b) accepting, for each respective bit position in said subset, an additional input of a rounding bit indicative of whether said respective bit position is said user-programmable bit position, said input circuitry outputting data to said multi-bit addition circuitry in a format common to each bit position regardless of the number of inputs to said input circuitry at said bit position.

2. The combined adding and rounding circuitry of claim 1 wherein said input circuitry comprises:

a 2:2 compressor for each bit position outside said subset; and a 3:2 compressor for each bit position in said subset.

3. The combined adding and rounding circuitry of claim 2 wherein said multi-bit addition circuitry comprises:

a first multi-bit adder for accepting at each bit position only one bit from each of said multi-bit numbers; and a second multi-bit adder for accepting data from said compressors.

4. The combined adding and rounding circuitry of claim 3 further comprising rounding logic for selecting between said first and second multi-bit adders.

5. The combined adding and rounding circuitry of claim 2 wherein:

said bit positions in said subset are in a consecutive range of bit positions;

said 3:2 compressor for each bit position in said subset comprises one 3:2 compressor corresponding to all bit positions in said subset; and said 2:2 compressor for each bit position outside said subset comprises one 2:2 compressor corresponding to all bit positions below said range, and one 2:2 compressor corresponding to all bit positions above said range.

6. The combined adding and rounding circuitry of claim 2 further comprising a prefix network; wherein:

said input circuitry is a first part of said prefix network; and a second part of said prefix network is part of said multi-bit addition circuitry.

7. The combined adding and rounding circuitry of claim 6 wherein said prefix network is a Kogge-Stone prefix network.

8. The combined adding and rounding circuitry of claim 6 wherein:

said second part of said prefix network outputs a first set of outputs representing a first rounding condition and a second set of outputs representing a second rounding condition;

said multi-bit addition circuitry further comprises:

a full multi-bit adder, and a multiplexer for selecting between said first and second sets of outputs and inputting said selected set of outputs to said full multi-bit adder; and said combined adding and rounding circuitry further comprises rounding logic for controlling said multiplexer.

9. The combined adding and rounding circuitry of claim 8 wherein:

said second part of said prefix network comprises a plurality of nodes; and each one of said nodes comprises multi-bit generate and propagate circuitry fed by at least two nodes above said one of said nodes.

10. The combined adding and rounding circuitry of claim 9 wherein each one of said nodes is fed by a node immediately above said one of said nodes, and by a node above and to the right of said one of said nodes.

11. The combined adding and rounding circuitry of claim 9 wherein each one of said nodes that is fed at least in part by one of said 3:2 compressors in said subset comprises two sets of said multi-bit generate and propagate circuitry for providing said first set of outputs representing said first rounding condition and said second set of outputs representing said second rounding condition.

12. The combined adding and rounding circuitry of claim 6 wherein said prefix network is populated in every bit position.

13. The combined adding and rounding circuitry of claim 6 wherein said prefix network is populated in every bit position in said subset, and in less than every bit position outside said subset.

14. The combined adding and rounding circuitry of claim 6 wherein said input circuitry comprises:

a 2:2 compressor for each bit position outside said range; and for each bit position in said range, a compressor that simultaneously performs 2:2 compression to provide a 2:2 compressed output and 3:2 compression to provide a 3:2 compressed output.

15. The combined adding and rounding circuitry of claim 14 further comprising rounding logic for selecting, for each bit position in said range, between said 2:2 compressed output and said 3:2 compressed output.

16. The combined adding and rounding circuitry of claim 15 further comprising circuitry for combining said selected compressed outputs.

17. A programmable logic device comprising a specialized processing block including the combined adding and rounding circuitry of claim 1.

18. A digital processing system comprising:

processing circuitry;

a memory coupled to said processing circuitry; and a programmable logic device as defined in claim 17 coupled to the processing circuitry and the memory.

19. A printed circuit board on which is mounted a programmable logic device as defined in claim 18.

20. The printed circuit board defined in claim 19 further comprising:

memory circuitry mounted on the printed circuit board and coupled to the programmable logic device.

21. The printed circuit board defined in claim 20 further comprising:

processing circuitry mounted on the printed circuit board and coupled to the memory circuitry.

22. An integrated circuit device comprising a specialized processing block including the combined adding and rounding circuitry of claim 1.

23. A digital processing system comprising:

processing circuitry;

a memory coupled to said processing circuitry; and an integrated circuit device as defined in claim 22 coupled to the processing circuitry and the memory.

24. A printed circuit board on which is mounted an integrated circuit device as defined in claim 23.

25. The printed circuit board defined in claim 24 further comprising:

memory circuitry mounted on the printed circuit board and coupled to the programmable logic device.

26. The printed circuit board defined in claim 25 further comprising:

processing circuitry mounted on the printed circuit board and coupled to the memory circuitry.

27. A method of rounding a sum, computed by circuitry for adding two multi-bit input numbers in a programmable logic device, to a user-programmable bit position selectable from among a subset of available bit positions, said method comprising:

for each bit position outside said subset, processing a bit from each of said multi-bit numbers using a first circuit that inputs two bits and produces a first output having a first number of output bits;

for each respective bit position in said subset, processing a bit from each of said multi-bit numbers with a rounding input indicative of whether said respective bit position is said user-programmable bit position, using a second circuit that inputs three bits and produces a second output having said first number of output bits; and combining said first and second outputs to produce a rounded sum.

28. The method of claim 27 wherein said processing comprises compressing, each of said first and second circuits comprising a compressor.

29. The method of claim 28 wherein:

said processing of each bit position outside said subset comprises 2:2 compression, said first circuit comprising a 2:2 compressor; and said processing of each bit position in said subset comprises 3:2 compression, said second circuit comprising a 3:2 compressor.

* * * * *